US005764999A

United States Patent [19]
Wilcox et al.

[11] Patent Number: 5,764,999
[45] Date of Patent: Jun. 9, 1998

[54] ENHANCED SYSTEM MANAGEMENT MODE WITH NESTING

[75] Inventors: Christopher G. Wilcox; Joseph F. Baldwin, both of Ft. Collins, Colo.; Xiaoli Y. Mendyke, Plano, Tex.

[73] Assignee: Cyrix Corporation, Richardson, Tex.

[21] Appl. No.: 541,359

[22] Filed: Oct. 10, 1995

[51] Int. Cl.$^6$ .................................................. G06F 11/00
[52] U.S. Cl. ..................... 395/734; 395/733; 395/735
[58] Field of Search ........................... 395/750, 869, 395/575, 733, 734, 375, 735, 742

[56] References Cited

U.S. PATENT DOCUMENTS

5,357,628  10/1994  Yuen .
5,509,139   4/1996  Ayash et al. .
5,551,044   8/1996  Shah et al. .

*Primary Examiner*—Jack B. Harvey
*Assistant Examiner*—Rupal D. Dharia
*Attorney, Agent, or Firm*—Andrew S. Viger; John L. Maxin

[57] ABSTRACT

An enhanced system management mode (SMM) includes nesting of SMI (system management interrupt) routines for handling SMI events. Enhanced SMM is implemented in an computer system to support a Virtual System Architecture (VSA) in which peripheral hardware, such as for graphics and/or audio functions, is virtualized (simulated by SMI routines). Reentrant VSA/SMM software (handler) includes VSA/SMI routines invoked either by (a) SMI interrupts, such as from non-virtualized peripheral hardware such as audio FIFO buffers, or (b) SMI traps, such as from accesses to memory mapped or I/O space allocated to a virtualized peripheral function. SMI nesting permits a currently active VSA/SMI routine to be preempted by another (higher priority) SMI event. The SMM memory region includes an SMI header segment and a VSA/SMM software segment— the SMI header segment is organized as a quasi-stack into which nested SMI headers are saved. The VSA/SMM software manages an SMHR register that points to the location for storing the SMI header for a currently active VSA/SMI routine if it is preempted by an SMI event. To improve performance, the entire SMM region is mapped into cacheable system memory. Features that support virtualization include: (a) SMI nesting, (b) SMI trapping for memory (as well as I/O) accesses, (c) caching both VSA/SMI headers and VSA/SMM software, and (d) configuring the SMM region for storing multiple SMI headers at programmable locations.

18 Claims, 7 Drawing Sheets

ENHANCED SYSTEM MANAGEMENT MODE WITH NESTING

CROSS REFERENCE

This is a related to a commonly-assigned co-pending U.S. patent applications: (1) Ser. No. 08/458,326, titled "Virtual Subsystem Architecture", filed Oct. 6, 1995; (2) Ser. No. 08/458,326, entitled "Virtualized Audio Generation And Capture In A. Computer", filed Jun. 2, 1995; and (3) Ser. No. 08/401,664, titled "Enhanced System Management Method and Apparatus", filed Mar. 9, 1995 (4) Ser. No. 08/522,219 titled "L2 Cache Interface". The disclosures in these applications is incorporated by reference.

BACKGROUND

1. Technical Field

The invention relates generally to computer systems, and more particularly relates to a computer system in which the processor implements an enhanced system management mode with nesting of SMI events.

In an exemplary embodiment, the invention is implemented in an x86 processor using the enhanced system management mode to support virtualization (in software) of hardware peripheral functions (such as VGA and sound card functionality).

2. Related Art

Computer systems include a processor and memory subsystem intercoupled over a processor bus, together with peripheral interface logic (such as peripheral controllers or interface cards) coupled to peripheral interconnect buses (such as PCI and ISA). System control and datapath interconnect functions over and between the processor and peripheral interconnect buses are performed by system (chipset) logic. Computer systems based on the x86 processor architecture typically support a system management mode (SMM) that can be invoked in a manner transparent to operating system and applications software. SMM provides a high priority system interrupt that can be asserted by the system logic, and in some implementations by the processor—in response, at least a portion of the machine state is saved, and an SMM handler is invoked to service the interrupt. An example of the use of SMM is for power management, such as the transparent shutdown and restart of peripherals.

Without limiting the scope of the invention, this background information is provided in the context of a specific problem to which the invention has application: reducing computer system hardware complexity and cost by virtualizing certain peripheral interface functions in software executed by the processor.

The related applications (1) and (2) are directed to a processor and computer system design including a virtual system (or subsystem) architecture (VSA) to reduce computer system complexity and cost by virtualizing (assimilating) in the processor selected peripheral interface functions normally performed by peripheral interface logic on the system motherboard. Exemplary embodiments described in the related applications are VSA virtualization for graphics and audio peripheral hardware functions.

An integral aspect of the virtual system architecture is a mechanism to transparently preempt normal processor execution to invoke VSA hardware virtualization software. Preferably, such a preemptive mechanism is implemented as a high priority system trapping/interrupt mechanism for transparently interrupting normal program execution.

Access trapping is synchronous with normal processor execution. An access to a VSA virtualized hardware function (such as graphics or audio) is trapped, and VSA software is invoked to process an associated VSA routine.

In contrast, interrupts are asynchronous with normal processor execution. Peripheral hardware requires service (such as an audio FIFO buffer from which audio data is being continually withdrawn). The peripheral hardware causes an interrupt to be generated, and VSA software first determines the source of the interrupt and then invokes the appropriate VSA routine.

If multiple peripheral interface functions are virtualized, VSA software in general and the preemptive mechanism in particular will be required to prioritize among concurrent trapping/interrupt events. For example, during a VSA graphics virtualization routine, audio hardware (such as a FIFO buffer) may require high priority service from the VSA audio virtualization routine. Moreover, it may be desirable to enable servicing lower priority interrupt functions (such as timers) during VSA virtualization.

Normal interrupt mechanisms are disadvantageous for the VSA preemptive mechanism. For example, nonmaskable interrupts (NMI) have the advantage of being high priority, but do not readily support a synchronous trapping.

Conventional SMM does provide a high priority system interrupt that can be asserted by either the system logic or the processor, and is adaptable to trapping. For example, in a power management application of SMM, accesses to an I/O address assigned to a peripheral may be trapped and an SMM handler invoked to test whether the peripheral has been powered down—if so, the peripheral is powered up, and the processor state is modified for a restart of the I/O instruction. Thus, SMM is designed for the transparent preemption of normal program execution for the purpose of handling system functions.

A problem with SMM is that as currently implemented it does not support nesting of SMI events. In one SMM implementation, if a second SMI event occurs during processing of a first SMI event, the second SMI event is latched and processed immediately after normal processing resumes from the first SMI event—the first SMI handling routine is not interrupted to handle the second SMI event regardless of the relative priority of the two events.

Another problem with current SMM implementations is that while they support I/O trapping, they do not support trapping for memory mapped accesses. Graphics peripheral cards use memory mapping for the video frame buffer (and sometimes control registers)—for compatibility reasons, I/O mapping is still generally used for the video control registers (such as for video timing, cursor control, color palette, and graphics modes).

Another problem with current SMM implementations is that they are typically too slow to support hardware virtualization. SMI handling requires saving processor state, invoking the SMI handling routine, processing the SMI routine, and restoring the processor state prior to resuming normal processing. In current SMM implementations, this process takes around 6–10 microseconds, while typical peripheral interface functions implemented by peripheral interface hardware typically take around 1–2 microseconds.

The related application (3) describes an enhanced SMM implementation that expedites SMM operations by saving only that portion of the processor state that will necessarily be modified by every SMM handling operation—if a particular SMI handling routine will modify other portions of the processor state, then the SMI handling routine saves those other portions of the processor state (special SMM instructions are provided for that purpose). This technique minimizes the processor state information that must be saved and restored, thereby reducing the overhead/latency associated with entry and exit from SMM mode.

Another technique that has been used to improve SMM performance is to make a portion of SMM space cacheable. In particular, in one SMM implementation, an SMM handler uses SMM space (which is noncacheable) to store SMM header information (including processor state), and then jumps to another region of memory that is cacheable. Thus, while the SMM overhead is not reduced (i.e., the processor state information that must be restored is not cached), performance of the SMM handler is improved by caching.

SUMMARY

An object of the invention is to facilitate a computer system design in which selected peripheral interface functions are virtualized in the processor, specifically by providing an enhanced system management mode to support such a virtual system architecture.

This and other objects of the invention are achieved by an enhanced system management mode (SMM) including SMI nesting. The enhanced SMM is implemented in a computer system that includes a processor and system memory, where the processor supports a system management mode of processing including a system management interrupt (SMI) mechanism that signals SMI events.

In one aspect of the invention, the enhanced system SMM includes a reentrant SMM software handler having for each of a plurality of SMI events a corresponding SMI routine. An SMM region is defined in the system memory, and includes an SMI context segment and a segment for the SMM handler.

SMM logic recognizes SMI interrupts and selectively invokes the SMM handler to process corresponding SMI routines.

For a first SMI event, the SMM logic stores first selected processor state information into the SMI context segment and invokes the SMM handler to process a corresponding first SMI routine. For a second SMI event that occurs during processing of the first SMI routine, the SMM logic stores second selected processor state information into the SMI context segment while continuing to maintain the first selected processor state information, and reenters the SMM handler to process a corresponding second SMI routine.

When the processor completes processing the second SMI routine, the SMM logic restores the second selected processor state information, and then resumes the preempted first SMI routine.

In another aspect of the invention, the SMI segment is implemented as a quasi-stack in which, each SMI event is allocated a corresponding location for storing corresponding selected processor state information. Thus, the first selected processor state information is stored in a first location, and the second selected processor state information is stored in a second location, with the first selected processor state information being maintained in the first location.

In another aspect of the invention, the SMI logic includes a register that stores the address pointer for the next location for storing selected processor state information in response to a next SMI event.

In another aspect of the invention, the SMI handler is cacheable. For the exemplary embodiment, both the SMI header and the SMI handler are cacheable.

In another aspect of the invention, an SMI event can be generated either internal or external to the processor.

In another aspect of the invention, an SMI event can be generated in response to an access to a memory mapped region of memory.

Embodiments of the invention may be implemented to realize one or more of the following technical advantages. The enhanced System Management Mode implements SMI nesting, such as to support virtualization of peripheral interface functions. SMM mode, including SMI nesting, may be invoked by an SMI signaled in response to a memory mapped access, such as to support virtualization of graphics functions. An SMM region, including SMI header/context information and reentrant VSA software, is mapped into cacheable system memory to increase performance (i.e., increase throughput and decrease overhead/latency). SMI header location/pointer and the top and bottom of the SMM memory region are precomputed by microcode to reduce latency associated with saving the SMI header, and thereby speed entry to the VSA software for servicing an SMI event. An SMHR register is used to provide an interface between microcode and the VSA software—when nesting is enabled, the VSA software updates the SMHR register to provide the address of the SMI header location to be used for the next SMI event, and this address is then used by the microcode in saving the SMI header in response to a nested SMI event.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DETAILED DESCRIPTION

The detailed description of an exemplary embodiment of the enhanced System Management Mode (SMM) with SMI nesting is organized as follows:

1. Computer System
2. Virtual System Architecture
    2.1. VSA Graphics Virtualization 2.2. VSA Audio Virtualization
3. Enhanced SMM
   3.1. SMM Configuration
      3.1.1. SMM Header
      3.1.2. SMHR Register
   3.2. SMM Nesting
      3.2.1. Context Stack
      3.2.2. Context Stack Management
      3.2.3. NEST/MODE Bits
   3.3. SMM Caching
4. Conclusion This organizational outline, and the corresponding headings, are used in this Detailed Description for convenience of reference only.

The exemplary enhanced SMM is described in connection with a computer system using an integrated processing unit based on the x86 instruction set architecture, and incorporating a memory controller, display controller, L2 cache controller, and PCI peripheral bus controller. The processor implements a Virtual System Architecture to virtualize graphics and audio peripheral interface functions, using the enhanced SMM to support nested SMI events associated with concurrent virtualized graphics and/or audio functions. Detailed descriptions of conventional or known aspects of processors and processor systems are omitted so as to not obscure the description of the invention. In particular, practitioners in the field are familiar with (a) terminology specific to the x86 instruction set architecture in general, and conventional systems management mode in particular, (such as register names, signal nomenclature, addressing modes, pinout definition, etc.), and (b) the basic design and operation of such processors and associated computer systems.

When used with a signal, the # symbol designates a signal that is active low, while the / symbol designates the complement of a signal.

The term "virtualize" means simulating properties or functions of a hardware device or subsystem that would result during normal processing of an application program so as to obviate such hardware device or subsystem.

1. Computer System

Figure 1:
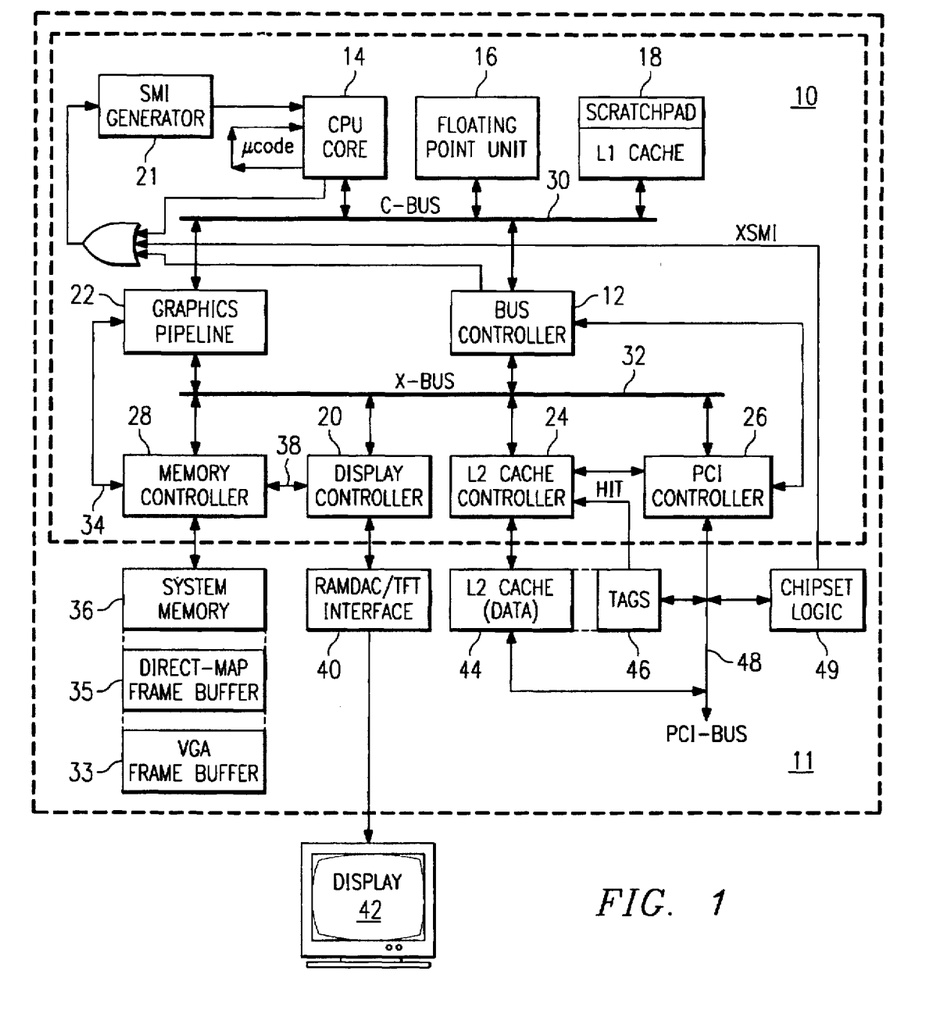
FIG. 1 illustrates an exemplary computer system that implements a Virtual System Architecture (VSA), including the enhanced System Management Mode with SMI nesting for both internally and externally signaled SMI interrupts.

FIG. 1 which depicts an exemplary, but not exclusive system, practiced in accordance with the principles of the present invention. A system circuit board 11 (a.k.a. motherboard) preferably includes buses to couple together a CPU 10, system memory 36, a RAMDAC/thin film transistor display panel interface 40, L2 cache 44, and chipset logic circuitry 49. A multi-tasking operating system program such as Microsoft® Windows™ preferably executes on the CPU 10 to manage primary operations.

The CPU 10 preferably includes the following functional units: an internal bus controller 12, a CPU core 14, a (level-one) L1 cache 18—part of which is partitionable as a scratchpad memory, a memory controller 28, a floating point unit (FPU) 16, a display controller 20, an internal SMI generator 21, a graphics pipeline (a.k.a. graphics accelerator) 22, a (level-two) L2 cache controller 24, and a PCI-bus controller 26.

The bus controller 12, the CPU core 14, the FPU 16, the L1 cache 18, and the graphics pipeline 22, are coupled together through an internal (with respect to the CPU 10) C-bus 30 whose exact configuration is not necessary for the understanding of the present invention. The bus controller 12, display controller 20, the graphics pipeline 22, the L2 cache controller 24, the PCI-bus controller 26, and the memory controller 28 are coupled together through an internal (with respect to the CPU 10) X-bus 32.

The details of the C-bus 30 and X-bus 32 are not necessary for the understanding of the present invention. It is sufficient to understand that independent C and X buses 30 and 32 decouple these functional units within the CPU 10 so that for example, the CPU core 14, the FPU 16, and L1 cache 18 can operate substantially autonomously from the remainder of the CPU 10, and so that other activities (e.g. PCI-bus transfers, L2 cache transfers, and graphics updates) can be conducted independently. More specifically, the C-bus 30 has sufficient bandwidth to allow the graphics pipeline 22 to access the scratchpad memory while the CPU core 14 is performing an unrelated operation.

The CPU core 14 in the preferred embodiment is a six stage execution pipeline. The exemplary execution pipeline includes the following stages:

IF Instruction Fetch—a plurality of bytes are fetched into a buffer,

ID Instruction Decode—decode and scoreboard checks,

AC1 Address Calculation—linear address calculations for memory references,

AC2 Operand Access—physical address translation, as well as cache and register file access, EX Execution—instruction execution, and WB Writeback—execution results written to register file and write buffers.

Those skilled in the art, with the aid of the present disclosure, will recognize other number of stages for the pipeline and other configurations for the CPU core 14 without departing from the scope of the present invention.

The L1 cache 18 is preferably, although not exclusively, a 16K byte unified data/instruction cache that operates in either a write-through or write-back mode. An area of the L1 cache 18 can be programmably partitioned as the scratchpad memory through configuration control registers (not shown) in the CPU core 14. Scratchpad control circuitry in the L1 cache 18 includes data pointers which can be used by either the CPU core 14 or the graphics pipeline 22 to access data in the scratchpad memory. The scratchpad memory may also be addressed directly by the CPU core 14.

An exemplary, but not exclusive, use for the scratchpad memory is as a blit buffer for use by the graphics pipeline 22. More specifically, whenever data is moved on the display 42, a raster line (scanline) or portion thereof, of data is read from the direct-mapped frame buffer 35 (preferably in system memory 36), written to the blit buffer partitioned out of the L1 cache 18, and then read back out and written to another region of the direct-mapped frame buffer 35. Programs executed by the CPU core 14 can also directly put data into the blit buffer and have the graphics pipeline 22 autonomously read it out and put it in the direct-mapped frame buffer 35.

The preferred L1 cache 18, along with other exemplary applications for the scratchpad memory, are described in co-pending U.S. patent application Ser. No. 08/464,921, filed Jun. 5, 1995, entitled "Partionable Cache", assigned to the Assignee of the present invention and herein incorporated by reference. It is to be understood however, that the L1 cache 18 may be larger or smaller in size or may have a Harvard "split" architecture without departing from the scope of the present invention. It is also to be understood that the scratchpad memory may be a memory separate for the L1 cache 18 without departing from the scope of the present invention.

The graphics pipeline 22 is coupled to the memory controller 28 through a dedicated bus 34 that expedites block moves of data from the scratchpad memory (blit buffer) to the VGA frame buffer 33 and to the direct-mapped frame buffer memory 35, which in the preferred embodiment, resides as part of system memory 36. The direct-mapped frame buffer memory 35 is addressed through the memory controller 28 producing a base address and the graphics pipeline 22 producing an offset, avoiding protection and privilege checks normally associated with address generation.

BitBlt operations of the graphics pipeline 22 are initiated by writing to a control register (not shown) in the CPU core 14 which specifies: i) the type of source data required, if any, frame buffer, or blit buffer; ii) the type of destination data required, if any, frame buffer, or blit buffer; iii) where the graphics pipeline 22 writes the data, direct-mapped frame buffer 35, or system memory 36, and iv) a source expansion flag. When the source is an image in system memory 36, the data is loaded from system memory 36 into the blit buffer before starting the BitBlt operation. Destination data is also loaded into the blit buffer when the graphics pipeline 22 renders to system memory 36.

The internal bus controller 12 coordinates and prioritizes transfers between the C and X buses 30 and 32, respectively. The memory controller 28 controls main system memory 36 and cooperates with the internal bus controller 12 to determine cacheability and permits all DMA cycles to automatically snoop the L1 cache 18 and the L2 cache 44. The FPU 16 performs floating point operations.

The display controller 20 which is coupled to the memory controller 28 through a fast link 38, retrieves image data from the direct-mapped frame buffer memory 35, performs a color look-up if required, inserts cursor and icon overlays into a pixel data stream, generates timing, and formats the pixel data for output to the RAMDAC/Thin Film Transistor (TFT) interface 40 which in turn drives a display 42.

The L2 cache controller 24 and PCI controller 26 collectively provide, inter alia, a high speed interface for an "off-chip" L2 cache 44 (with respect to the CPU 10). The preferred, although not exclusive, L2 cache interface is described in co-pending U.S. patent application Ser. No. 08/xxx,xxx, filed Aug. 31, 1995, entitled "L2 Cache Interface", assigned to the Assignee of the present invention and herein incorporated by reference. It is to be understood however, the other forms for the L2 cache interface may be practiced without departing from the scope of the present invention. It should also be understood that while the L2 cache 44 shares the same physical data, address, and control lines on the PCI-bus 48, that for performance reasons, the clock speed and communication protocol are not necessarily related to the PCI protocol. Data accesses to the L2 cache 44 are mutually exclusive with other "PCI-like" PCI-bus 48 accesses, however, writes to the PCI-bus 48 do access the cache tag and control logic circuitry 46 and invalidate the tag on a hit.

In the preferred embodiment, the cache tag and control logic circuitry 46, which determines whether a hit/miss has occurred, is provided separately from the data cache 44 in external chipset logic circuitry 49. Those skilled in the art will recognize other forms and arrangements for the: cache tag and control logic circuitry 46, such as, but not limited to, integrated circuitry onto the CPU 10, without departing from the scope of the present invention.

The SMI generator 21 receives a first input from the CPU core 14, a second input from the internal bus controller 12, and a third input (XSMI) from a source external to the CPU 10, preferably from the chipset logic circuitry 49. Chipset logic circuitry 49 is coupled to the PCI-bus 46 and preferably has interface logic including, but not limited to, FIFO buffers for receiving incoming and outgoing data and indicators to indicate fullness of a given buffer. The chipset logic circuitry 49 preferably also includes comparators and other trap circuitry to detect and indicate the occurrence of predetermined events outside the CPU 10.

2. Virtual System Architecture

Referring to FIG. 1, the exemplary computer system 11 implements a virtual system architecture (VSA) in which peripheral hardware functions are virtualized using VSA software. VSA virtualization is used for both graphics and audio functions, reducing the amount of peripheral interface hardware necessary to support those peripheral applications.

The related application (1) describes an exemplary embodiment of VSA for graphics virtualization. The related application (2) describes an exemplary embodiment of VSA for audio virtualization.

The Virtual System Architecture implements an enhanced System Management Mode that supports nested SMI operations. The VSA software comprises an SMM handler that includes graphics and audio virtualization routines, as well as other SMI routines for servicing non-virtualization SMI events, such as power management and system interrupts.

The VSA software may be invoked in response to SMI interrupts signaled either internally or externally to processor 10. Internal SMI events are signaled by SMI generator 21, while external SMI events are signaled by chipset 49. For the exemplary VSA implementation, internally-signaled SMIs are all memory-mapped or I/O traps, while externally-signaled SMIs are either I/O traps or interrupts.

The principal difference between internal and external SMIs is in the amount of information available to the processor 10 (CPU core 14) at the time the SMI is generated. For internally-signaled SMIs, the processor has available the source and/or specific cause of the SMI, as well as the context specific processor state information that must be saved prior to processing the associated SMM handler routine to allow the transparent resumption of processing. For externally-signaled SMIs, the chipset 49 includes SMI control registers that must be read by the processor to determine the source of an SMI.

2.1. VSA Graphics Virtualization

VSA graphics virtualization is described in the related application (1). In general, for the exemplary VSA implementation, VSA graphics virtualization is invoked primarily by internally-signaled memory-mapped and I/O access traps. Specifically, in an exemplary implementation, SMI events will be signaled for (a) memory writes to graphics regions of the memory map, and (b) for I/O read/write accesses to I/O mapped graphics control registers.

Referring to FIG. 1, memory access trapping is performed by the CPU core 14 (during the address calculation stage of the execution pipeline), while I/O read/write trapping is implemented in bus controller 12—because of timing considerations, memory mapped accesses are trapped early in the execution pipeline and are not allowed to go out on the external bus. In response to a memory-mapped or I/O trap, the CPU core or bus controller signals the SMI event to SMI generator 21, which in turn signals an SMI interrupt to CPU core 14—in response to the SMI, the VSA software is invoked which will call the appropriate VSA graphics virtualization routine to service the SMI. The SMM header information indicates that the SMI was an internally-signaled graphics access, and whether the SMI resulted from a memory-mapped or I/O access (see, Section 3.1.1).

In addition to the internally-signaled memory-mapped and I/O trap SMIs, the exemplary VSA graphics virtualization can be invoked by externally-signaled SMIs (such as for video timing or postponing display update).

2.2. VSA Audio Virtualization

VSA audio virtualization is described in detail in the related application (2). In general, for the exemplary VSA implementation, VSA audio virtualization is invoked by externally-signaled I/O access traps and interrupts generated by audio interface logic. Specifically, SMI events will be signaled for (a) I/O accesses to I/O mapped audio functions or hardware (such as audio registers), and (b) hardware interface functions such as audio FIFO buffer management.

I/O accesses are trapped in chipset 49, which also includes the audio interface logic (such as the audio FIFO buffers). For each SMI event signaled, the chipset stores in external SMI status registers the corresponding SMI identifier code. When the processor takes the SMI and invokes the VSA software, the SMI status register is read to determine the source of the external SMI.

3.0. Enhanced SMM

The Virtual System Architecture implements an enhanced System Management Mode that allows nested VSA/SMI routines to support the virtualization of peripheral hardware functions. Other enhancements to conventional SMM implementations improve the performance of virtualization by reducing SMI overhead/latency.

For the exemplary enhanced System Management Mode, an SMM region of memory is defined conventionally using an SMAR register that holds the base and limit of the SMM region. The SMM region comprises (a) a header/context stack segment for storing multiple nested SMI headers, and (b) a VSA software segment storing reentrant VSA software including VSA/SMI routines such as the exemplary VSA graphics and VSA audio virtualization routines.

Specific SMM feature enhancements for the exemplary enhanced System Management Mode include:

- SMM mode may be invoked for memory mapped accesses, as well as I/O mapped accesses and asynchronous interrupts, providing maximum flexibility in virtualizing graphics, audio, and other peripheral hardware functions—the SMI header stores the 32-bit address and 32-bit data for memory or I/O mapped accesses.
- The VSA software, includes multiple VSA/SMI routines, and is reentrant for multiple nested SMIs.
- The SMM region includes a header/context segment with a quasi-stack arrangement for storing multiple nested SMI headers.
- A new SMHR register is defined to provide an address pointer into the header/context segment of the SMM region—for a currently executing VSA/SMI routine in which nesting has been enabled, SMHR stores the physical address pointing to the location for storing, in response to an SMI, the SMI header for that routine.
- The SMHR register is managed by the VSA software, and provides a hardware interface between the VSA software and the processor microcode.
- To reduce SMM entry overhead, when SMI nesting is enabled, the processor microcode reads SMHR and precomputes and stores a 32-bit pointer address for the next SMI header location.
- The SMI header indicates whether the SMI interrupt was generated internally for a graphics (VGA) access.
- The SMI header indicates whether the SMI interrupt resulted from a trap, and whether the trap resulted from a memory or I/O access.
- An SMI_NEST bit has been added to a control register to control nesting of SMI interrupts.
- The SMM region, including context stack and VSA software, resides in cacheable system memory (SMADS# is not used).

Figure 2A:
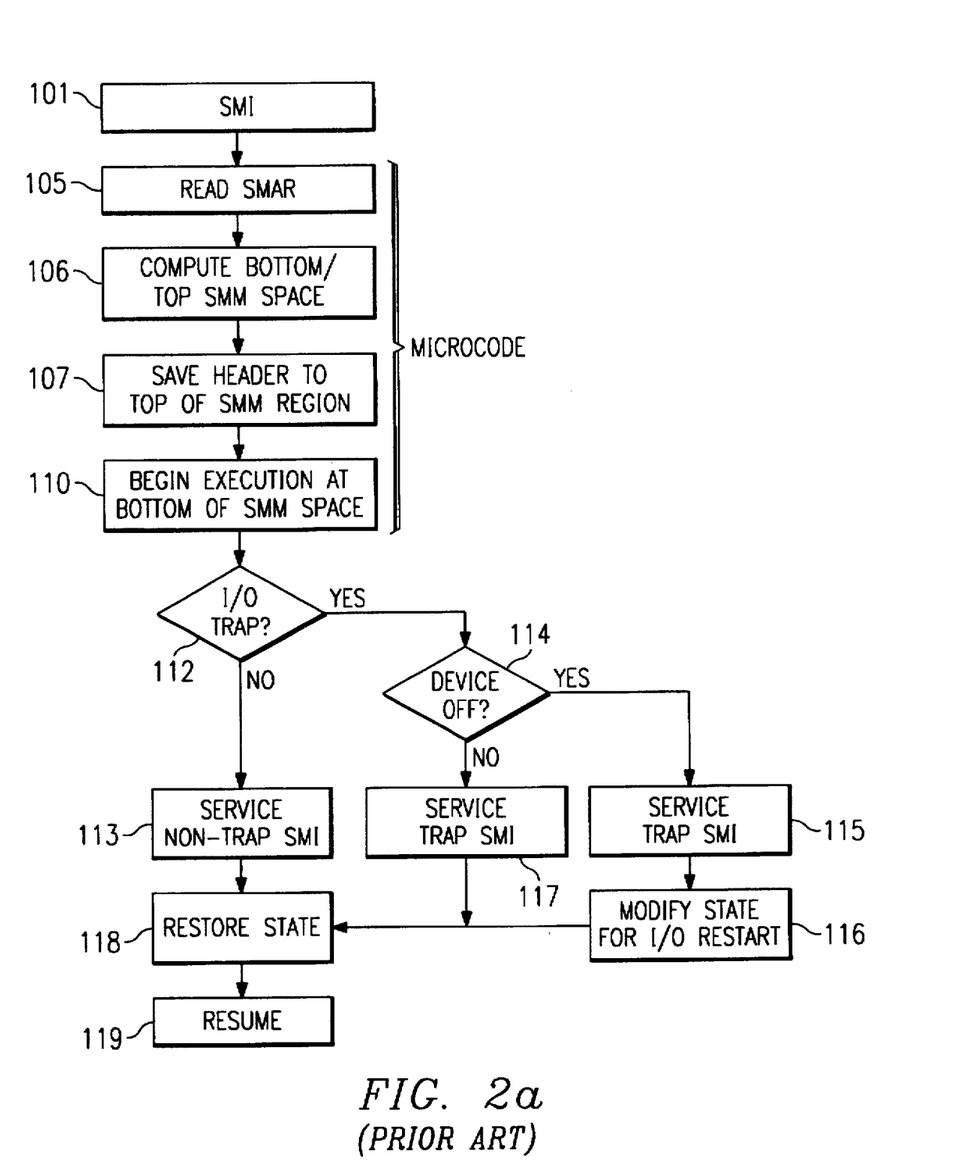
FIG. 2a illustrates the general operation of a conventional SMM handler, including I/O trapping for power management.

FIG. 2a illustrates a conventional SMM handler operation. In response to an SMI event (101), microcode reads (105) the SMAR register and computes (106) the top and bottom of SMM space. The SMM header is then saved (107) to the top of SMM space, and execution of the SMI handler (110) begins at the bottom of SMM space.

The SMI handler determines whether the SMI resulted from an I/O trap (112). If not, the SMI handler services the non-trap SMI (113). If an I/O access to a peripheral device caused the SMI, the SMI handler determines whether the device is powered down (114), and if so, powers up the peripheral and services the trap SMI (115), including modifying state information (116) to allow restart of the I/O instruction that caused the trap. Other functions that may be performed in servicing the trap SMI include shadowing write-only registers in the peripheral.

When the SMI handler completes servicing the SMI event, it restores (118) the processor state using the SMM header, and exits by notifying the processor to resume (119) normal processing.

Figure 2B:
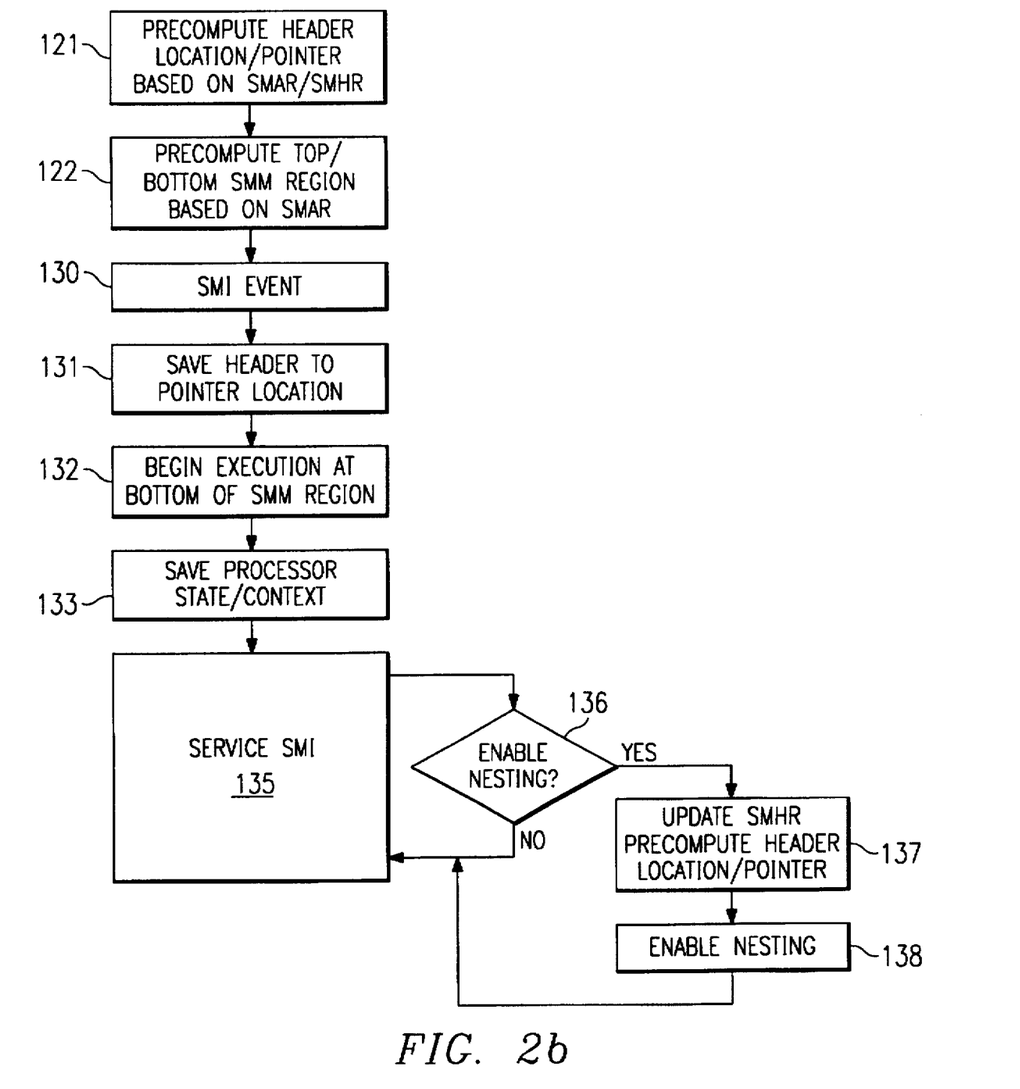
FIG. 2b illustrates in general the operation of the enhanced SMM including SMI nesting, such as to support peripheral hardware virtualization.

FIG. 2b illustrates in general the operation of the enhanced System Management Mode including SMI nesting, such as to support peripheral hardware virtualization as part of the Virtual System Architecture.

To improve performance by reducing SMM entry overhead, microcode precomputes (using the SMHR and SMAR register contents) and stores (a) the SMI header location/pointer (121) within the header/context segment of the SMM memory region, and (b) the top and bottom of the SMM region (122). For the exemplary implementation, precomputation of the SMI header pointer principally involves reformatting the SMI header location stored in the SMHR register into a 32-bit, dword aligned pointer address (see, Section 3.1.2).

In response to an SMI event (130), the SMI header is saved (131) into the location within the header/context segment of the SMM region pointed to by the SMHR register, and execution begins (132) in the VSA software at the bottom of the SMM region. Any additional context dependent processor state information is saved (133) by the VSA software, which then dispatches, based on the source of the SMI, to the appropriate VSA/SMM routine (such as a graphics or audio virtualization routine). The VSA/SMM routine services (135) the SMI event.

If appropriate, the VSA/SMI routine may enable SMI nesting (136). To enable SMI nesting, the VSA/SMI routine first updates (137) the SMHR register to point to the next header location within the context stack segment, and then enables (138) nesting. Once SMI nesting is enabled, the VSA/SMI routine (135) can be interrupted by another SMI event.

3.1. SMM Configuration

The enhanced Systems Management Mode includes, in addition to the SMHR register, the following SMM configuration features:

- An SMI header a bit indicating whether the SMI interrupt was generated internally for a graphics (VGA) access.
- An SMI header bit indicating whether an SMI trap results from a memory or I/O access.

An SMI header field for a 32-bit address and 32-bit data for memory or I/O accesses.

An SMI_NEST bit in a control register that controls nesting of SMI interrupts.

In addition, the exemplary Virtual System Architecture includes two additional configuration registers to programmably control and mask SMI interrupts in the graphics memory space. In conventional x86 computer systems, the system memory region from 640K to 768K (128K) is reserved for graphics—the region is typically divided into three address ranges: A0000h–AFFFFh (64K), B0000h–B7FFFh (32K), and B8000h–BFFFFh (32K). A control register is used to selectively enable/disable SMI interrupts in these address ranges. A mask register is used to selectively disable 2K regions within the first 64K address range A0000h–AFFFFh—the purpose of masking is to prevent SMI interrupts when accessing non-displayed graphics memory. This exemplary implementation can be extended to provide for full programmability by allowing a mask region to be selectively defined by a start and end address.

3.1.1. SMI Header

The exemplary SMI header organization is shown below. In particular, in addition to I/O address and data fields, a memory address field is included for traps to memory-mapped regions—the memory data is stored overlapping the I/O data because these events cannot occur simultaneously. The I/O address is valid for both IN and OUT instructions, and I/O data is valid only for OUT. For the exemplary implementation, the memory address is valid for reads and writes, and memory data is valid only for writes.

M 0 for I/O, 1 for memory

X External SMI pin

V Internal graphics access

N SMI during SMM mode

In particular, the M and V fields are used to define an internally-signaled SMI that will be serviced by the VSA graphics virtualization routine, while the X field indicates that the SMI was signaled externally.

The N field is an SMM_MODE bit that indicates whether the SMI is a nested SMI, i.e., whether it occurred while the processor was in SMM mode. The processor uses the SMM_MODE bit on exit from servicing an SMI event to determine whether to stay in SMM mode or resume normal processing.

3.1.2. SMHR Register

The exemplary enhanced System Management Mode provides a new configuration control register—SMHR—that is used to support SMI nesting. Specifically, SMHR specifies a 32-bit physical SMI header address, and is used to define the SMI header location for the next SMI event.

The SMI header includes the following bit fields used to define the SMI event that caused the SMI:

| SMHR Register | | | |
|---|---|---|---|
| Reg. Index = B3h | Reg. Index = B2h | Reg. Index = B1h | Reg. Index = B0h |
| Name = SMHR3 | Name = SMHR2 | Name = SMHR1 | Name = SMHR0 |
| 7 | 7 | 7 | 7 |
| A31 | A23 | A15 | A7 |
| SMM Header Address | SMM Header Address | SMM Header Address | SMM Header Address |

C code segment writeable
I 0 for in/read, 1 for out/write
P REP instruction
S SMINT instruction
H SMI during CPU halt Note that the exemplary SMHR register configuration is as four separate 8-bit configuration registers. Each time SMHR is modified, microcode reads the SMHR register and precomputes (reformats) and stores a 32-bit address that points to the SMI header location specified by the SMHR register—the SMHR address must be dword aligned, so the bottom two bits are ignored by the microcode.

Figure 3:
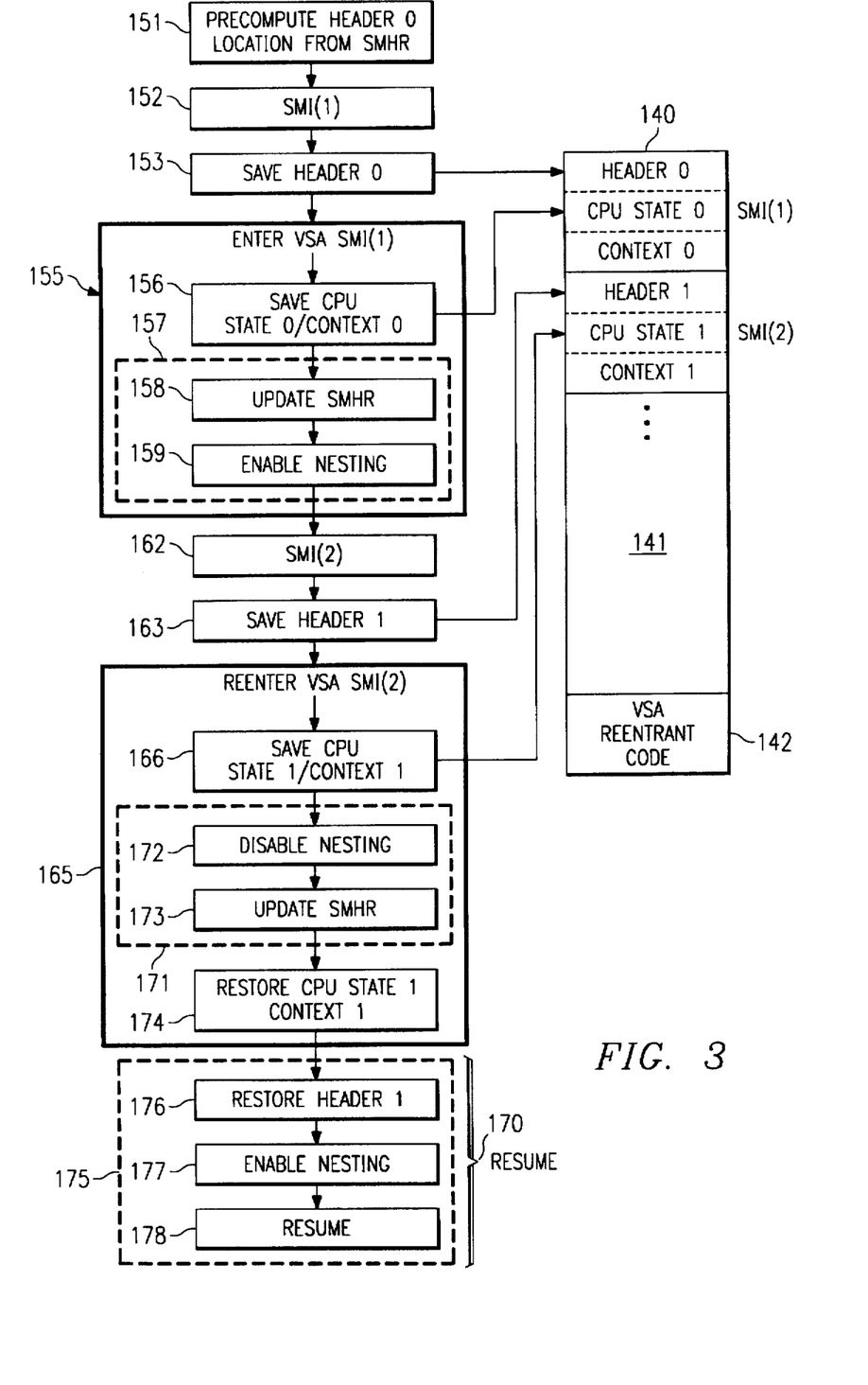
FIG. 3 illustrates the mapping of the exemplary SMM region, including an SMI header/context segment for nested SMI events and reentrant VSA software.

FIG. 3 illustrates the mapping of the exemplary SMM region 140, including the SMI header/context stack segment 141 and reentrant VSA software segment 142. The conventional SMAR register still specifies the code base and limit for the SMM region.

The SMI header/context segment is organized as a quasi-stack that is managed by the VSA software (see, Section 3.2). In general, the SMHR register is updated by the VSA software in managing SMI Nesting—when nesting is enabled by the VSA software, SMHR is updated to point to the next SMI header location.

The SMHR register must be setup after SMAR, because it overwrites the SMI header address computed when SMAR is written.

3.2. SMM Nesting

The enhanced System Management Mode supports the nesting of SMI events. The exemplary nesting scheme uses a quasi-stack arrangement for storing multiple SMI headers and associated context-dependent information—this arrangement supports reentrancy for the VSA software that handles SMI events.

Referring to FIG. 3, for each nested SMI event, the corresponding SMI header is stored in a predetermined location in the SMI header/context segment 141 of the SMM memory region 140. SMI header location is managed by the VSA software using the SMHR register (see, Section 3.2.2).

SMI nesting enables dynamic prioritization of SMI events. A particular advantage of the feature of the enhanced System Management Mode is the support it provides for the Virtual System Architecture in implementing peripheral hardware virtualization, such as for virtualizing in the processor graphics and audio functions.

For example, the dynamic prioritization afforded by SMI nesting allows a higher priority virtualization event, such as audio FIFO buffer control, to interrupt a lower priority SMI handler for graphics virtualization (or power management). Nesting can be selectively enabled/disabled during a VSA/SMI routine to provide prioritization control.

For the exemplary implementation of SMI nesting, if internal and external SMI signals are received simultaneously, then the internal SMI is given priority to avoid losing the event—nesting may be immediately enabled to allow a higher priority externally signaled SMI event to interrupt a lower priority internally signaled SMI.

3.2.1. Context Stack

Referring to FIG. 3, the SMI header/context stack segment 141 of the SMM region 140 stores, for each SMI event, the corresponding SMI header. SMI header locations are determined by the VSA software 142 by updating SMHR in connection with enabling/disabling SMI nesting.

For the exemplary embodiment, each SMI event may be characterized by three types of context-dependent information:

an SMI header
additional CPU state information
other context dependent information When an SMI is taken, the SMI header is assembled by microcode and saved into the SMM region prior to entering the VSA software. The VSA software then controls what additional context-dependent information must be saved to restore processor state when the associated VSA/SMI routine completes.

The SMI header, represents a minimal amount of processor state information required to resume after servicing an SMI. The related application (3) describes expediting entry and exit from an SMI routine by including in the SMI header only a portion of the processor state—special SMM instructions are provided to allow the SMI routine to save other portions of the processor state into the SMM region prior to servicing the SMI event. The exemplary enhanced SMM uses this approach to providing maximum flexibility in designing the VSA software.

In addition to the processor state information included in an SMI header, the VSA software may also save additional processor state and other context-dependent information (such as VSA system state variables). The VSA software begins execution by saving such processor state and context-dependent information prior to dispatching to the appropriate VSA/SMI routine for servicing the SMI event.

FIG. 3 illustrates the use of the exemplary SMI header/context segment 141 in connection SMI nesting operations implemented by the enhanced System Management Mode. Illustrated are the processing states 0 Program Execution
1 SMI Event 1
2 SMI Event 2

During normal program execution, in preparation for responding to an SMI event, microcode has precomputed (151) the pointer to SMI header location 0, i.e., the physical address within SMI header/context segment 141 for the SMI header 0 associated with normal program execution.

When SMI(1) is signaled (152), the microcode saves SMI header 0 to the precomputed location 0 (SMI nesting is disabled).

The VSA software is entered (155), and selected additional CPU state and context-dependent information is saved (156) to the appropriate location in the SMI header/context segment 141 associated with the SMI header 0. The VSA software then decodes the source of the SMI(1) and dispatches to an appropriate VSA/SMI routine for servicing the SMI(1).

Depending on the VSA/SMI routine, nesting may be enabled (157). Enabling nesting is a two step procedure in which (a) the SMHR register is first updated (158) to point to the location in the SMI header/context segment 141 for storing header information associated with SMI(1), and then (b) nesting is enabled (159) by asserting SMI_NEST. When SMHR is updated (written), microcode precomputes the pointer to the SMI header 1 location.

If a second SMI(2) event is signaled (162) before the VSA/SMI routine for SMI(1) finishes servicing the SMI(1) event, then because nesting has been enabled (157), the VSA/SMI(1) routing is preempted. Microcode responds to the SMI(2) by saving (163) the SMI header 1 associated with SMI(1) to the location in the SMI header/context segment 141 pointed to by SMHR.

The VSA software is reentered (165), and selected additional CPU state and context-dependent information is saved (166) to the appropriate location in the SMI header/context segment 141 associated with the SMI header 1. The VSA software then decodes the source of the SMI(2) and dispatches to an appropriate VSA/SMI routine for servicing the SMI(2).

Assuming that the VSA/SMI(2) routine completes servicing the SMI(2) event without another SMI being recognized, the VSA/SMI routine will exit by first disabling nesting (171) if nesting was enabled. As with enabling nesting, disabling nesting is a two step procedure in which (a) nesting is disabled (172) by deasserting SMI_NEST, and then (b) the SMHR register is updated (173) to point to the location in the SMI header/context segment 141 for storing the preempted SMI header 1 in response to a new SMI(2).

When nesting is disabled, the VSA/SMI routine 165 restores (174) the processor state and context-dependent information stored in the SMI header/context segment 141 along with the SMI header 1. Once this information is restored, the VSA/SMI routine initiates a resume operation (175), with control passing to microcode.

In executing the resume operation (175), microcode performs three functions: (a) the SMI header 1 is restored from the SMI header/context segment 141, (b) nesting is enabled by asserting SMI_NEST, and (c) preempted processing, in this case the VSA/SMI(1) routine, is resumed (178). Note that after resume operation (175) for the nested SMI (165) is complete, the processor is restored to the state it was in when the SMI(2) was taken—SMI header 1 and associated CPU state and context-dependent information have been restored (174, 176), and SMI nesting is enabled (177, which corresponds to 159).

The exemplary enhanced System Management Mode implements the SMI header/context segment as a quasi-stack in contiguous memory. Alternatively, separate arrays for the three types of context information—SMI header, additional CPU state, and context-dependent information—could be used.

3.2.2. Context Stack Management

The exemplary enhanced System Management Mode uses a VSA context stack management mechanism for managing SMI nesting in connection with the SMI header/context segment (141 in FIG. 3a). VSA context stack management is implemented jointly by the VSA software (142 in FIG. 3a) and processor microcode using the SMHR register and SMI_NEST bit.

The exemplary VSA context stack management is designed to provide maximum flexibility in implementing SMI nesting in general, and in particular SMI nesting for VSA peripheral hardware virtualization. The interface between the VSA software and processor microcode is provided by the SMHR register—this register is updated by the VSA software, and used (but not modified) by the microcode.

Figure 4:
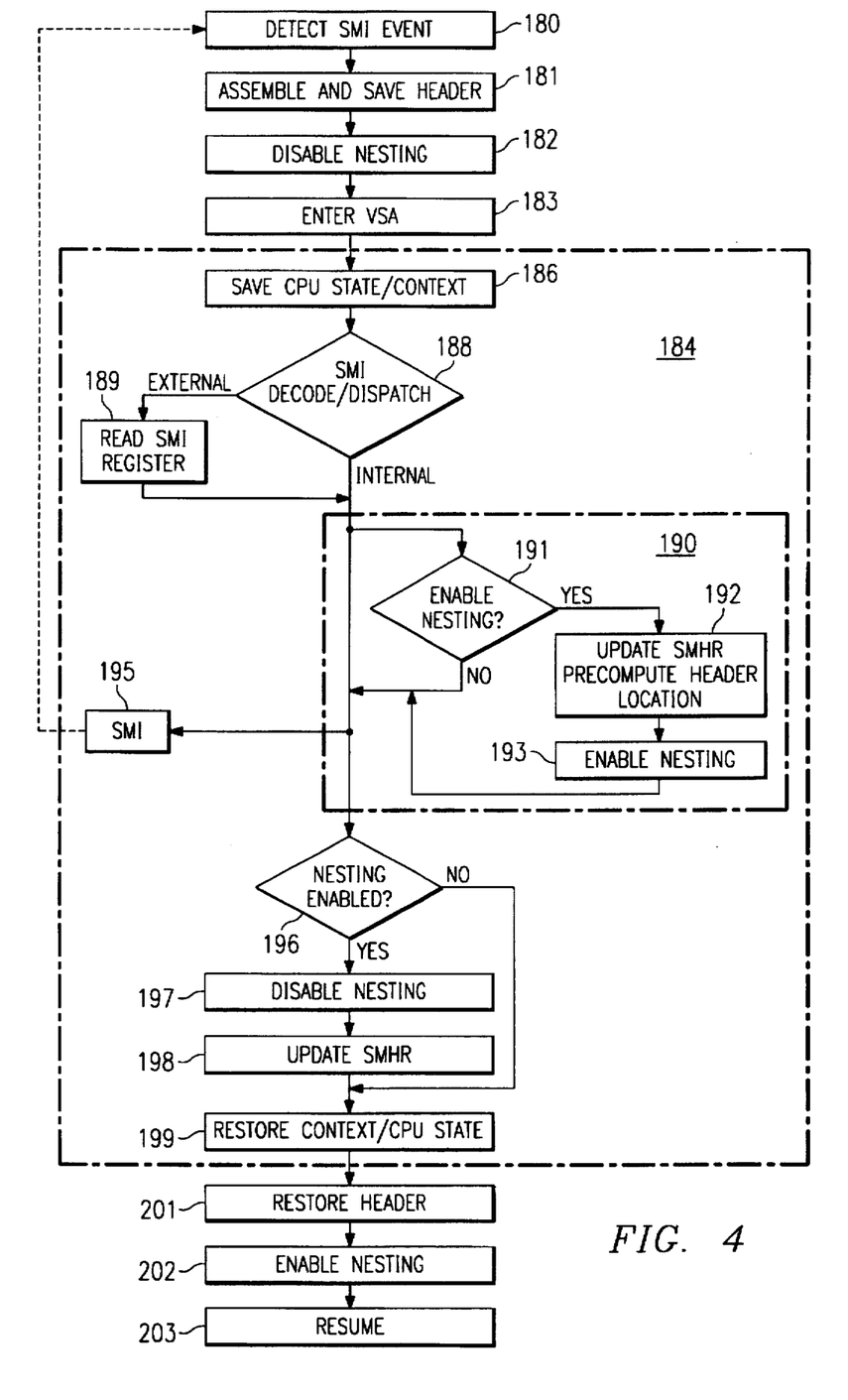
FIG. 4 illustrates the enhanced SMM including VSA context stack management for SMI nesting.

FIG. 4 illustrates the enhanced System Management Mode including VSA context stack management for SMI nesting. In general, VSA context stack management and microcode ensure that for nested SMIs, nesting is
- disabled by microcode prior to entering VSA software to handle the nested SMI
- enabled by microcode upon exiting a VSA/SMI routine after processor state restoration During processing of a VSA/SMI routine, nesting may be enable/disabled at any time (including not enabling SMI nesting at all).

When an SMI event is detected (180), the microcode assembles and saves (181) the SMI header into the SMI header/context segment. See, Section 3.1.1 regarding the SMI header configuration (including SMI event description bits) and Section 3.2.1 regarding the SMI header/context segment of the SMM memory region.

Microcode then disables nesting (182) prior to entering the VSA software (183). Upon entry, the VSA software saves (186) selected additional CPU state/context information into the SMI header/context segment.

The VSA software then performs decode and dispatch operations (188) to determine the source of the SMI event, and thereby which VSA/SMI routine to dispatch for servicing the SMI. In particular, if the SMI is internally signaled, the SMI header will contain enough information for dispatch, while if the SMI is externally signaled, the VSA software will read (189) SMI status registers in the chipset logic (49 in FIG. 1) to determine the source of the SMI prior to dispatch. The exemplary SMI decode/dispatch mechanism uses separate tables for internally and externally signaled SMIs, each storing SMI event flag masks and associated VSA/SMI routines.

After decoding the source of the SMI, the VSA software dispatches to the appropriate VSA/SMI routine (190) to service the SMI event. Note that, at this point, SMI nesting is disabled (182).

During processing of the VSA/SMI routine (190), SMI nesting may be enabled (191). If a particular SMI event can be handled in a short amount of time, or if it cannot be interrupted, the VSA/SMI routine may not enable SMI nesting. Or, even though SMI nesting may be initially enabled, at a certain point, SMI nesting may be temporarily disabled, or disabled until servicing the SMI event is complete.

To enable SMI nesting, the VSA/SMI routine first updates (192) the SMHR register, and then enables (193) nesting. When the SMHR register is updated with the SMI header location address, microcode precomputes the pointer to the header location within the SMI header/context stack in preparation for receiving an SMI event (195) during the currently active VSA/SMI routine (190).

If the VSA/SMI routine (190) completes servicing the SMI event without being preempted by another SMI, it terminates the SMI handling operation, and control is returned to the VSA software (184).

The VSA software then restores processor state in preparation for resuming either normal processing or a preempted VSA/SMI routine. If SMI nesting is enabled (196), then nesting is disabled (197) and SMHR is updated (198). The VSA software then restores (199) CPU state and other context dependent information from the SMI header/context segment, and the passes control to microcode which performs a resume operation.

Microcode effects a resumption of interrupted processing by restoring (201) the SMI header from the SMI header/context segment and enabling nesting (202). The interrupted processing then resumes (203).

This exemplary quasi-stack arrangement for managing SMI nesting provides significant flexibility. Alternative approaches to SMI nesting management include implementing full stack operation in either the VSA software, or in microcode.

3.2.3. NEST/MODE Bits

Figure 5:
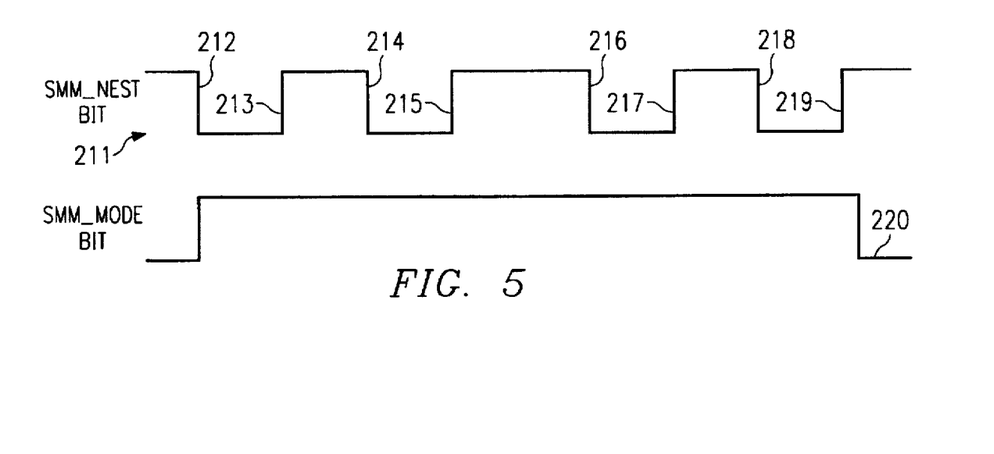
FIG. 5 illustrates state transitions of the SMI_NEST and SMM_MODE bits for SMI nesting operations.

FIG. 5 further illustrates the exemplary SMI nesting feature of the enhanced System Management Mode by showing state transitions of the SMM_NEST and SMM_MODE bits.

When the processor is outside of SMM mode (211), SMM_MODE is clear and SMI_NEST is set. When the first level SMI interrupt is received (212) by the processor, the microcode clears SMI_NEST and sets SMM_MODE—it then saves the previous value of SMM_MODE (0) in the SMI header, and saves the SMI header.

SMI interrupts may be reenabled by a VSA/SMI routine, which updates SMHR and sets (213) SMI_NEST. With SMI_NEST set (nesting enabled), a second level (nested)

SMI can be taken (214) even though the processor is in SMM mode—in response, the microcode clears SMI_NEST and sets SMM_MODE, and then saves the previous value of SMM_MODE (1) in the SMI header, and saves the SMI header.

A second level VSA/SMI routine dispatched to handle the second level SMI event can reenable SMI interrupts by updating SMHR and setting (215) SMI_NEST. Another level of SMI nesting could occur during this period.

Once the second level VSA/SMI routine completes servicing the SMI, the VSA software clears (216) SMI_NEST to disable SMI interrupts, and then updates SMHR. A resume operation is then performed by the microcode.

The microcode sets (217) SMI_NEST to reenable nesting, and restores the SMM_MODE based on the SMI header (in this case, SMM_MODE is set). Processing resumes with the first level VSA/SMI handler.

When the first level VSA/SMI handler completes servicing the SMI, it returns to the VSA software which initiates a resume operation by clearing (218) SMI_NEST to disable SMI interrupts, and updating SMHR.

The microcode sets (219) SMI_NEST, and restores (220) the SMM_MODE (0) based on the SMI header.

When the processor is outside of SMM mode, SMM_MODE is always clear and SMI_NEST is set.

3.3. SMM Caching

The exemplary enhanced System Management Mode uses caching to improve performance, both by reducing overhead/latency in entering and exiting the VSA software, and in increasing throughput in processing VSA/SMI routines.

The conventional SMADS# (SMI address strobe) is not used—instead, a region of cacheable system memory is allocated for the SMM memory region. The cacheable SMM region includes SMI header, CPU state and other context-dependent information as well as the reentrant VSA software (FIG. 3).

Figure 6A:
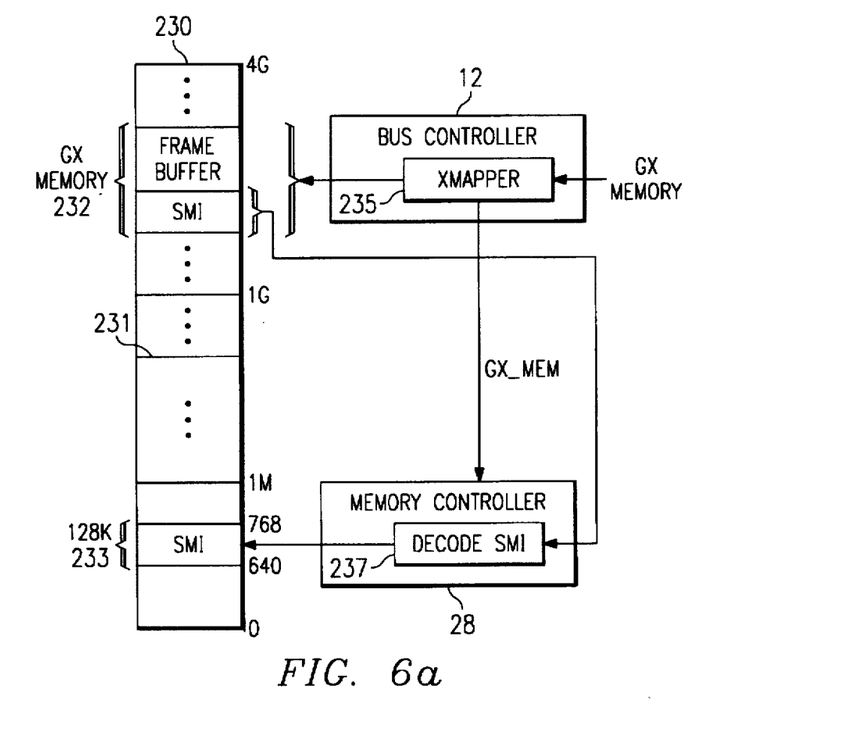
FIGS. 6a and 6b illustrate the exemplary mapping of the SMM region into cacheable system memory, and the associated cacheability control mechanisms in the bus controller and memory controller.

FIG. 6a illustrate the exemplary memory mapping scheme for mapping the SMM region into cacheable system memory. This memory mapping function is performed by the bus controller 12 and memory controller 28 (see, also, FIG. 1).

The exemplary 32-bit x86 processor (10 in FIG. 1) has an address space 230 of 4 Gbytes. Current computer systems provide 4-16 Mbytes of system memory (36 in FIG. 1)—the top of system memory (DRAM) is indicated at 231. The region of system memory 640K to 1M is typically reserved for peripheral and BIOS functions—the 128K region from 640K to 768K is typically reserved for graphics (see, Section 3.1) memory (VGA), while the region from 768K to 1M is used for other peripherals and BIOS functions.

The address space above the top of system memory 231 (i.e., above-DRAM address space) is commonly used for mapping peripheral functions. For example, a graphics peripherals will use a portion of this address space to designate special graphics registers and/or functions.

The Virtual System Architecture uses a portion of the above-DRAM address space to establish a GX Memory map region 232. For the exemplary Virtual System Architecture, the GX Memory map region includes a video frame buffer and the SMM region.

The memory controller 28 remaps the GX Memory map region down into physical memory. The exemplary remapping approach is to remap the frame buffer to the top of system memory, and to remap the SMM region into the 640K to 768K region of system memory usually reserved for graphics functions (but which is not needed by the VSA for such functions).

The bus controller 12 includes an Xmapper 235 that decodes addresses from the C-Bus (30 in FIG. 1) to provide various control signals. One such control signal—GX_MEM—is use to indicate addresses that are within GX Memory 232.

In response to the assertion of GX_MEM, memory controller 28 performs a 2-bit decode to determine whether the address, which is within the GX Memory region 232, is within the frame buffer or the SMM region. If the address is within the SMM region, the memory controller performs the remapping to the SMM region 233 in system memory.

Figure 6B:
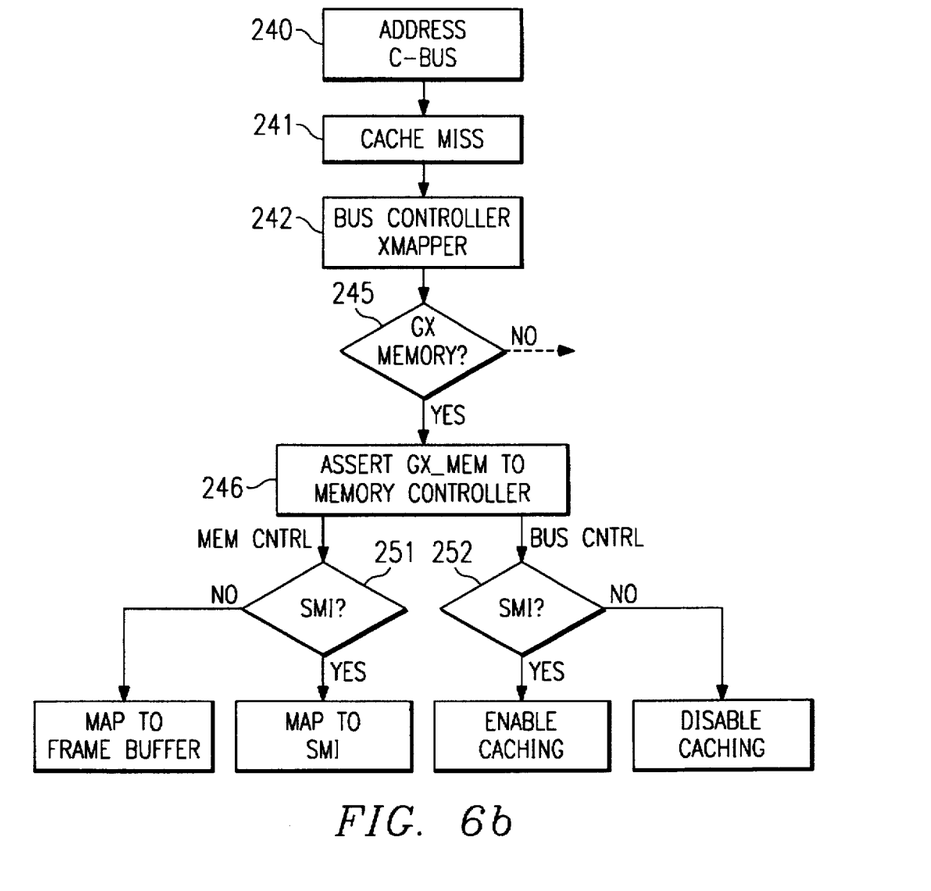

FIG. 6b illustrates the cache control operations associated with accesses to the SMM memory region. If the bus controller receives (240) an address from the C-Bus, and a cache miss is signaled by the cache (18 in FIG. 1), the bus controller will decode the address (242) to determine whether a cache line fill cycle should be run.

If the bus controller decodes the address as within GX Memory (245), it asserts GX_MEM (246) to the memory controller. Both the bus controller and the memory controller perform a 2-bit decode of the address to detect whether the access is directed to cacheable SMM memory.

If the bus controller determines that the address is within the SMM region (252), it will assert an internal KEN# (cache enable) signal indicating a cacheable line fill in response to the cache miss. At the same time, the memory controller will decode the address as within the SMM region, and perform the remapping to an address within the SMM region 233.

4. Conclusion

Although the Detailed Description of the invention has been directed to certain exemplary embodiments, various modifications of these embodiments, as well as alternative embodiments, will be suggested to those skilled in the art.

For example, the description of the enhanced System Management Mode in connection with the Virtual System Architecture in general, and virtualizing graphics and audio peripheral hardware functions in particular, is exemplary only. Also, the specific implementation of the enhanced SMM, including the specific implementation for SMI nesting, including such configuration and control features as the SMHR register, microcode precomputation of SMI header location, and the use of the SMII_NEST and SMM_MODE control signals, is exemplary only. Also, the SMI nesting aspect of the invention is applicable to SMI from any source or cause, internally or externally signaled traps (memory or I/O accesses) or interrupts.

In addition, specific register structures, mappings, bit assignments, and other implementation details are set forth solely for purposes of providing a detailed description of the invention in connection with an exemplary x86 processor and computer system.

Also, references to dividing data into bytes, words, double words (dwords), quad words (qwords), etc., when used in the claims, are not intended to be limiting as to the size, but rather, are intended to serve as generic terms for blocks of data.

Moreover, various modifications based on trade-offs between hardware and software logic will be apparent to those skilled in the art. Also, the allocation of functions between VSA software and the various VSA/SMI routines is exemplary.

The invention encompasses any modifications or alternative embodiments that fall within the scope of the Claims.

We claim:

1. In a computer system including a processor and system memory, where the processor supports a system management mode (SMM) of processing including a system management interrupt (SMI) mechanism that signals SMI events, an enhanced system management mode including SMI nesting comprising:

a reentrant SMM handler including each of a plurality of SMI events a corresponding SMI routine;

an SMM region defined in the system memory, the SMM region including an SMI context segment and an SMM handler segment;

SMM logic that recognizes SMI events and selectively invokes the SMM handler to process corresponding SMI routines;

for a first SMI event, the SMM logic stores first selected processor state information into the SMI context segment and invokes the SMM handler to process a corresponding first SMI routine;

for a second SMI event that occurs during processing of the first SMI routine, the SMM logic stores second selected processor state information into the SMI context segment while continuing to maintain the first selected processor state information, and reenters the SMM handler to process a corresponding second SMI routine;

such that, when the processor completes processing the second SMI routine, the SMM logic restores the second selected processor state information, and resumes processing the first SMI routine.

2. The computer system including enhanced SMM of claim 1, wherein the SMI segment is implemented as a quasi-stack in which each SMI event is allocated a corresponding location for storing corresponding selected processor state information, such that the first selected processor state information is stored in a first location and the second selected processor state information is stored in a second location.

3. The computer system including enhanced SMM of claim 2, wherein the SMM logic includes a register that stores an address pointer for a next location for storing selected processor state information in response to a next SMI event.

4. The computer system including enhanced SMM of claim 1, wherein the computer system includes cache memory, and the SMI handler is cacheable.

5. The computer system including enhanced SMM of claim 1, wherein an SMI event can be generated either internal or external to the processor.

6. The computer system including enhanced SMM of claim 1, wherein an SMI event can be generated by a memory mapped access.

7. In a computer system including a processor and system memory, where the processor supports a system management mode (SMM) of processing including a system management interrupt (SMI) mechanism that: signals SMI events, an enhanced system management mode including SMI nesting, comprising:

reentrant SMM handler means for associating with each of a plurality of SMI events a corresponding SMI routine;

SMM regions means for defining an SMM region in the system memory, the SMM region including an SMI context segment and an SMM handler segment;

SMM means for recognizing SMI events and selectively invoking the SMM handler to process corresponding SMI routines;

for a first SMI event, the SMM means storing first selected processor state information into the SMI context segment and invoking the SMM handler means to process a corresponding first SMI routine;

for a second SMI event that occurs during processing of the first SMI routine, the SMM means storing second selected processor state information into the SMI context segment while continuing to maintain the first selected processor state information, and reentering the SMM handler means to process a corresponding second SMI routine;

when the processor completes processing the second SMI routine, the SMM means restoring the second selected processor state information, and resuming processing the first SMI routine.

8. The computer system including enhanced SMM of claim 7, wherein the SMI segment is implemented as a quasi-stack in which each SMI event is allocated a corresponding location for storing corresponding selected processor state information, such that the first selected processor state information is stored in a first location and the second selected processor state information is stored in a second location.

9. The computer system including enhanced SMM of claim 8, wherein the SMM means includes a register that stores an address pointer for a next location for storing selected processor state information in response to a next SMI event.

10. The computer system including enhanced SMM of claim 7, wherein the computer system includes cache memory, and the SMI handler means is cacheable.

11. The computer system including enhanced SMM of claim 7, wherein an SMI event can be generated either internal or external to the processor.

12. The computer system including enhanced SMM of claim 7, wherein an SMI event can be generated by a memory mapped access.

13. A method enhanced system management including SMI nesting for use in a computer system including a processor and system memory, where the processor supports a system management mode (SMM) of processing including a system management interrupt (SMI) mechanism that signals SMI events, comprising the steps:

providing an SMM handler that includes, for each of a plurality of SMI events, a corresponding SMI routine;

defining an SMM region in the system memory, the SMM region including an SMI context segment and an SMM handler segment;

selectively invoking, in response to SMI events, the SMM handler to process corresponding SMI routines;

for a first SMI event, storing first selected processor state information into the SMI context segment and invoking the SMM handler to process a corresponding first SMI routine;

for a second SMI event that occurs during processing of the first SMI routine, storing second selected processor state information into the SMI context segment while continuing to maintain the first selected processor state information, and reentering the SMM handler means to process a corresponding second SMI routine;

when the processor completes processing the second SMI routine, restoring the second selected processor state information, and resuming processing the first SMI routine.

14. The method of enhanced system management of claim 13, wherein the SMI segment is implemented as a quasi-stack in which each SMI event is allocated a corresponding location for storing corresponding selected processor state information, such that the first selected processor state information is stored in a first location and the second selected processor state information is stored in a second location.

15. The method of enhanced system management of claim 14, further comprising the step of storing an address pointer for a next location for storing selected processor state information in response to a next SMI event.

16. The method of enhanced system management of claim 13, wherein the computer system includes cache memory, and the SMI handler is cacheable.

17. The method of enhanced system management of claim 13, wherein an SMI event can be generated either internal or external to the processor.

18. The method of enhanced system management of claim 13, wherein an SMI event can be generated by a memory mapped access.

* * * * *